US012735833B2

(12) United States Patent
Venugopal et al.

(10) Patent No.: US 12,735,833 B2
(45) Date of Patent: Sep. 15, 2026

(54) MULTIPURPOSE GARMENT CARE DEVICE

(71) Applicant: HCL Technologies Limited, New Delhi (IN)

(72) Inventors: Anjali Venugopal, Bangalore (IN); Karthikeyan Sabapathy, Bangalore (IN); Sanjay Stalin, Bangalore (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 18/985,008

(22) Filed: Dec. 17, 2024

(65) Prior Publication Data

US 2025/0230604 A1 Jul. 17, 2025

(30) Foreign Application Priority Data

Jan. 15, 2024 (IN) ............................ 202411002931

(51) Int. Cl.
*D06F 75/16* (2006.01)
*B08B 3/12* (2006.01)
(Continued)

(52) U.S. Cl.
CPC ................ *D06F 75/16* (2013.01); *B08B 3/12* (2013.01); *D06F 58/20* (2013.01); *D06F 75/26* (2013.01);
(Continued)

(58) Field of Classification Search
CPC .......... D06F 75/16; D06F 75/10; D06F 75/32; D06F 75/26; D06F 75/30; D06F 58/20; D06F 79/00; D06F 73/00; B08B 3/12
See application file for complete search history.

(56) References Cited

U.S. PATENT DOCUMENTS 4,583,260 A * 4/1986 Zai ............................ A47L 5/24
15/328
2005/0028408 A1* 2/2005 Tobias .................... D06F 75/34
38/75
(Continued)

FOREIGN PATENT DOCUMENTS

CN 202430546 U 9/2012
CN 105862379 A 8/2016
CN 217629046 U 10/2022

OTHER PUBLICATIONS

Buy cello Multi Functional 800 W Steam Iron Online at Flipkart.com. www.flipkart.com/cello-multi-functional-800-w-steam-iron/p/itmdb9871a20d841?pid=IRNFFYY8JCAYZ4GS&lid=LSTIRNFFYY8JCAYZ4GSI7KILK&marketplace=FLIPKART&cmpid=content_iron_8965229628_gmc. Accessed Dec. 17, 2024.

*Primary Examiner* — Uyen T Nguyen
(74) *Attorney, Agent, or Firm* — Kendal M. Sheets

(57) ABSTRACT

The invention relates to a multipurpose garment care device. The multipurpose garment care device includes a main unit. The main unit includes a steam iron including a sole plate, a water compartment, and a set of buttons for operating the steam iron. The multipurpose garment care device further includes a detachable handle unit positioned within a cavity of the main unit. The detachable handle unit includes a blower dryer mechanism. The blower dryer mechanism further includes a first set of blower vents and a second set of blower vents, a blower dryer casing, and a detachable pair of hanger attachments. The multipurpose garment care device further includes an ultrasonic stain removing head for removing stains, and a fabric shaving head for removing lint and fuzz that is collected in a collector compartment affixed to the fabric shaving head.

9 Claims, 16 Drawing Sheets

(51) Int. Cl.

| | |
|---|---|
| ***D06F 58/20*** | (2006.01) |
| ***D06F 75/26*** | (2006.01) |
| ***D06F 75/30*** | (2006.01) |
| ***D06F 75/34*** | (2006.01) |
| ***D06F 79/00*** | (2006.01) |

(52) U.S. Cl.
CPC .............. *D06F 75/30* (2013.01); *D06F 75/34* (2013.01); *D06F 79/00* (2013.01)

(56) References Cited

U.S. PATENT DOCUMENTS

| | | | | |
|---|---|---|---|---|
| 2012/0211383 | A1* | 8/2012 | Otsuka | D06F 79/02 206/320 |
| 2020/0141047 | A1* | 5/2020 | Chang | D06F 58/00 |
| 2020/0141051 | A1 | 5/2020 | Clowes | |
| 2020/0266646 | A1* | 8/2020 | Li | H01M 10/052 |

* cited by examiner

MULTIPURPOSE GARMENT CARE DEVICE

TECHNICAL FIELD

This invention generally relates to clothes maintenance. More specifically, the invention relates to a multi-purpose garment care device.

BACKGROUND

In the fast-paced landscape of the modern world, travel has seamlessly knitted itself into our daily lives, becoming an integral part of routine for millions of people worldwide. Moreover, the convergence of globalization, technological advancements, and evolving work dynamics has given rise to a society where travel is no longer a luxury but a necessity, particularly in the realm of professional life. Further, travel is no longer confined to annual vacations, it has now evolved as a multifaceted tool that fosters both professional and personal growth. However, while travel has become a significant part of people's lives, there is a challenge that many people encounter in keeping their clothes in a top-notch condition when travelling. All individuals, especially of the current generation including a business traveler to an adventure seeker, ensure to maintain their wardrobe's freshness and style throughout their journey.

However, maintaining clothes during travel is not an easy task with traditional existing approaches as it involves relaying on a usage of a variety of separate devices and products such as a steam iron, stain remover, lint remover, and more, where each of these devices serves a specific purpose. Since each of these devices serve a specific purpose, their individual use poses various challenges for users. The challenges of using multiple separate devices could include allocation of separate storage space for each device whether in cupboards of our homes or in our travel bags. Furthermore, setting-up and locating these devices individually when needed may be inconvenient and time-consuming. Also, purchasing each of these devices separately may incur additional expenses each owing to separate price tag and maintenance cost. Therefore, to address these drawbacks and in order to be suitable for the evolving lifestyle of modern users, there is a growing demand for compact, travel-friendly, multifunctional device that integrate various clothing maintenance features into a single, user-friendly design.

The present invention is directed to overcome one or more limitations stated above or any other limitations associated with the known arts.

SUMMARY

In one embodiment, a multipurpose garment care device is disclosed. In one example, the multipurpose garment care device may include a main unit. The main unit may include a steam iron including a sole plate, a water compartment, and a set of buttons for operating the steam iron. The multipurpose garment care device may further include a detachable handle unit positioned within a cavity of the main unit. It should be noted that the detachable handle unit may include a blower dryer mechanism. The blower dryer mechanism may further include a first set of blower vents located on a bottom surface and a second set of blower vents located on opposite sides, of the detachable handle unit. The blower dryer mechanism may further include a blower dryer casing detachably attached to a rim surrounding the bottom surface of the detachable handle unit. It should be noted that the blower dryer casing may include a third set of blower vents and a pair of attachment holders. The first set of blower vents may get aligned with the third set of blower vents to create an air column, upon attaching the blower dryer casing with the rim. The blower dryer mechanism may further include a detachable pair of hanger attachments including a fourth set of blower vents. It should be noted that the detachable pair of hanger attachments may get connected to the pair of attachment holders of the blower dryer casing. The multipurpose garment care device may further include an ultrasonic stain removing head located on the bottom surface on one side of the detachable handle unit. It should be noted that the ultrasonic stain removing head may be positioned within a hollow section on the bottom surface of the detachable handle unit. The multipurpose garment care device may further include a fabric shaving head and a collector compartment affixed to the fabric shaving head to collect lint and fuzz. The fabric shaving head may be located opposite to the ultrasonic stain removing head on the bottom surface on another side of the detachable handle unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
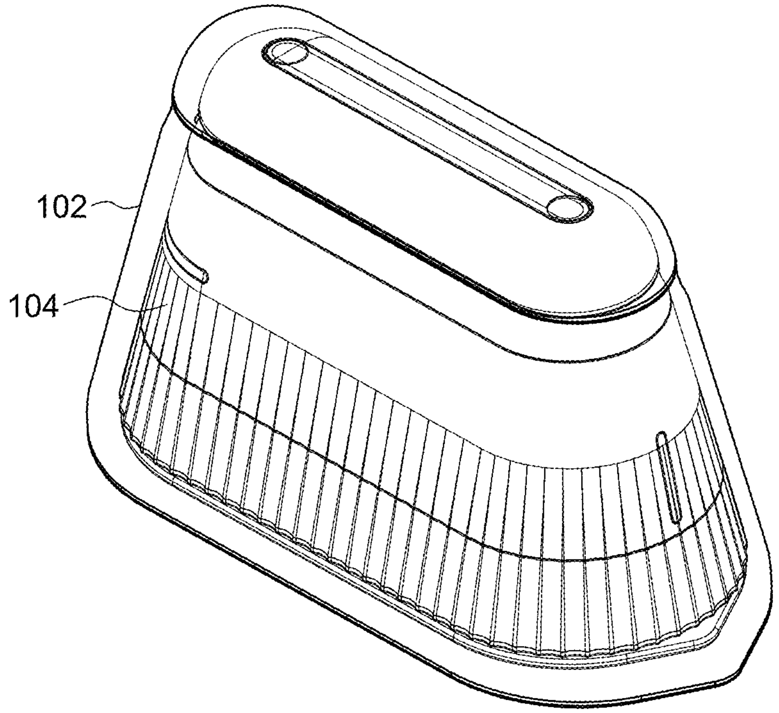
FIGS. 1A-1B illustrate an exemplary casing for an exemplary multipurpose garment care device, in accordance with some embodiments of the present disclosure.
Figure 1B:
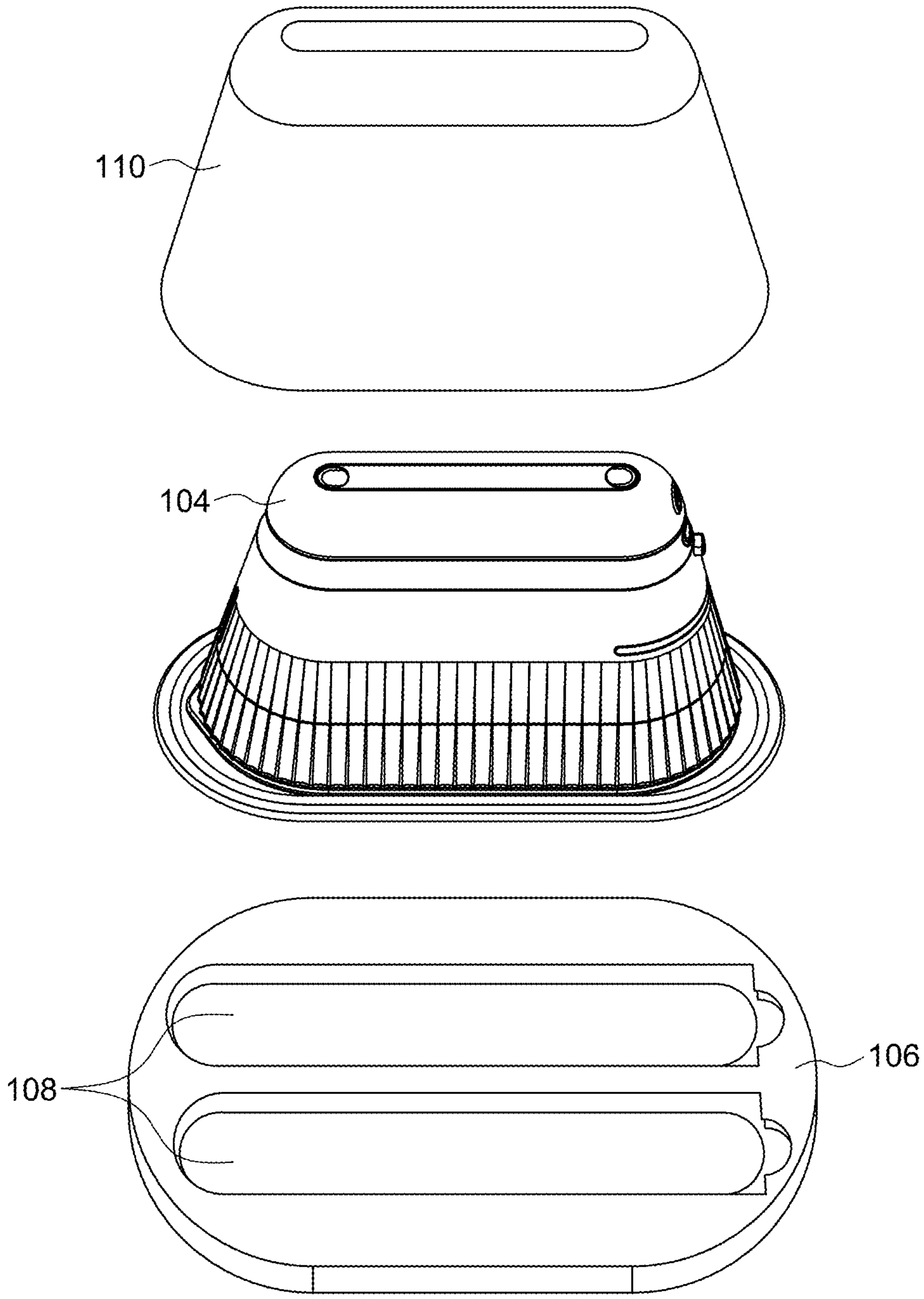

Referring now to FIGS. 1A and 1B, an exemplary casing 102 for an exemplary multipurpose garment care device 104 is illustrated, in accordance with some embodiments of the present disclosure. As depicted via FIG. 1A, the casing 102 may be configured to store the multipurpose garment care device 104. The casing may be configured to store the multipurpose garment care device 104 in a way such that the multipurpose garment care device 104 is completely covered. To store the multipurpose garment care device 104, the casing 102 may include a base portion 106, as depicted via FIG. 1B. Further, the base portion 106 may include a pair of inbuilt slots 108. Each of the pair of inbuilt slots 108 may be configured to store a detachable hanger attachment from a detachable pair of hanger attachments. In other words, one inbuilt slot may be configured to store one detachable hanger attachment. This is further depicted and explained in conjunction with FIGS. 5A-5E.

Further, the base portion 106 may include a slot (not shown) for storing a detachable power cord. The detachable power cord may be required to electrically operate the multipurpose garment care device 104. In other words, the multipurpose garment care device 104 may be electrically operated via the detachable power cord. Further, the detachable power cord may be stored within the slot in the bottom portion 106 when the multipurpose garment care device 104 may not be in use. The multipurpose garment care device 106 may be placed on top surface of the base portion 106. The casing 102 may further include a covering lid 110. Once the multipurpose garment care device 104 is placed on the base portion 106, then the covering lid 110 may get coupled to the base portion 106 to completely cover the multipurpose garment care device 104 within the casing 102. It should be noted that the multipurpose garment care device 104 may be operated as one of a steam iron, a blower dryer, an ultrasonic stain remover, and a fabric shaver. This is further explained in detail in conjunction with FIG. 3 to FIG. 7C.

Figure 2:
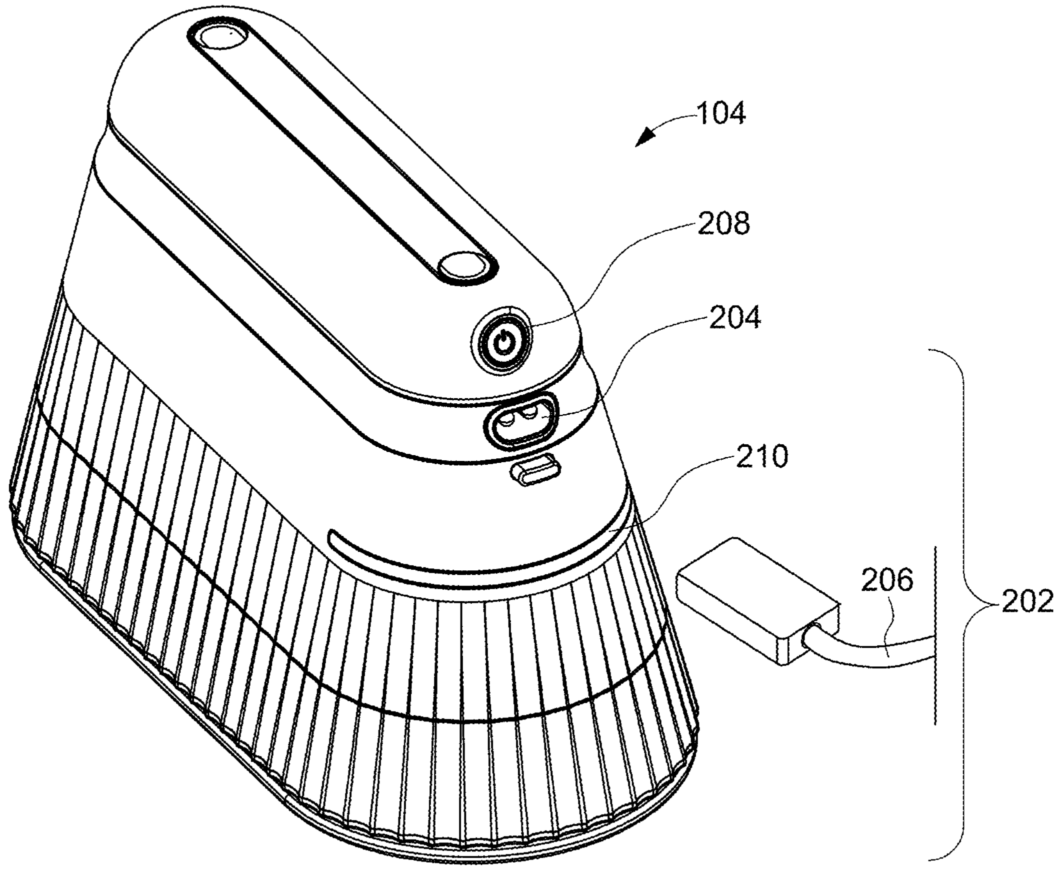
FIG. 2 illustrates a perspective view of a multipurpose garment care device, in accordance with some embodiments of the present disclosure.

Referring now to FIG. 2, a perspective view of the multipurpose garment care device 104 is illustrated, in accordance with some embodiments of the present disclosure. FIG. 2 is explained in conjunction with FIGS. 1A and 1B. In the perspective view, a first end 202 of the multipurpose garment care device 104 is depicted. In an embodiment, the first end 202, for example, may be a back end (or back portion) of the multipurpose garment care device 104. As depicted via the FIG. 2, the first end 202 may include a cord port 204 that is present on an outer surface. The cord port 204 may be an inbuilt connecting slot. Further, a detachable power cord 206 may be connected to the cord port 204. The detachable power cord 206 may be an electric cord configured to electrically operate the multipurpose garment care device 104, upon connecting the detachable power cord 206 to the cord port 204.

In some embodiments, the multipurpose garment care device 104 may be rechargeable. In particular, in some embodiments, the cord port 204 may be a universal serial bus (USB) port. In addition, the detachable power cord 206 may be a USB cable configured to charging the multipurpose garment care device 104 based on user requirements. Further, in this embodiment, once the multipurpose garment care device 104 is charged, then the multipurpose garment care device 104 may be operated without connecting the detachable power cord 206 to the cord port 204. Apart from the USB port other examples of the cord port 204 may include, but are not limited to, an Alternative Current (AC) power port, a Direct Current (DC) power port, and a thunderbolt power port. As will be appreciated, a type of the detachable power cord 206 configured to operate the multipurpose garment care device 104 may vary based on the cord port 204 of the multipurpose garment care device 104.

In addition to the cord port 204, the first end 202 of the multipurpose garment care device 104 may include a power button 208. The power button 208 may be used to turn on or off the multipurpose garment care device 104 to enable or disable functioning of the multipurpose garment care device 104, respectively, upon connecting the detachable power cord 206 to the cord port 204. Furthermore, the first end 202 of the multipurpose garment care device 104 may also include a temperature indicator 210. The temperature indicator 210 may be indicative of temperature of a soleplate of the steam iron. The temperature of the soleplate is monitored in real-time by temperature sensors integrated near heating elements of the soleplate. In other words, the temperature indicator 210 may indicate whether the soleplate is heating and has reached a desired temperature.

As will be appreciated, in an embodiment, when a user of the multipurpose garment care device 104 may use it as the steam iron, then in this case, the user may select a desired fabric setting for a garment that needs to be ironed. Upon selecting the desired fabric setting, once the soleplate of the steam iron may have reached a desired temperature based on the fabric setting, then the temperature indicator 210 may turn off to indicate that the soleplate has reached the desired temperature. It should be noted that the temperature indicator 210 may be configured to indicate that the steam iron is ready for use, to the user, and protects the soleplate from overheating, thus avoiding garments from being damaged. The steam iron including the soleplate is depicted and explained in greater detail in conjunction with FIG. 4.

Referring now to FIGS. 3A-3D, various components of a multipurpose garment care device are illustrated, in accordance with some embodiment of the present disclosure. FIGS. 3A-3D is explained in conjunction with FIGS. 1A-2. As depicted via FIG. 3A, the multipurpose garment care device 104 may include a main unit 302, and a detachable handle unit 304. The detachable handle unit 304 may be positioned within a cavity 306 of the main unit 302. In addition, a blower dryer casing 310 may be attached to the detachable handle unit 304. Further, the main unit 302 may include the steam iron. To operate the multipurpose garment care device 104 as the steam iron, the detachable handle unit 304 may remain coupled with the main unit 302. A technique of operating the multipurpose garment care device 104 as the steam iron is further explained in detail in conjunction with FIG. 4.

Further, in order to operate the multipurpose garment care device 104 as one of the blower dryer, the ultra-sonic stain remover, and the fabric shaver, the detachable handle unit 304 may be drawn out from the cavity 306 of the main unit 302. In particular, the detachable handle unit 304 may be drawn out from the cavity 306 of the main unit 302 to access one of a blower dryer mechanism, an ultrasonic stain removing head, or a fabric shaving head to operate the multipurpose garment care device 104 as one of the blower dryer, the ultra-sonic stain remover, and the fabric shaver, respectively. In other words, the user of the multipurpose garment care device 104 may uncouple the detachable handle unit 304 from the main unit 302 when the user may want to use any one of the blower dryer mechanism, the ultrasonic stain removing head, or the fabric shaving head integrated to the detachable handle unit 304. As depicted via the present FIG. 3A, when the detachable handle unit 304 is drawn out from the cavity 306, the blower dryer casing 310 may be attached to it. To operate the blower dryer mechanism, the ultrasonic stain removing head, or the fabric shaving head, the detachable handle unit 304 may include a switch 308. The switch 308 may be used to select a corresponding operating mode for the blower dryer mechanism, the ultrasonic stain removing head, or the fabric shaving head. Examples of the switch 308 may include, a toggle switch, a slide switch, a dual in-line package (DIP) switch, and the like.

Figure 3A:
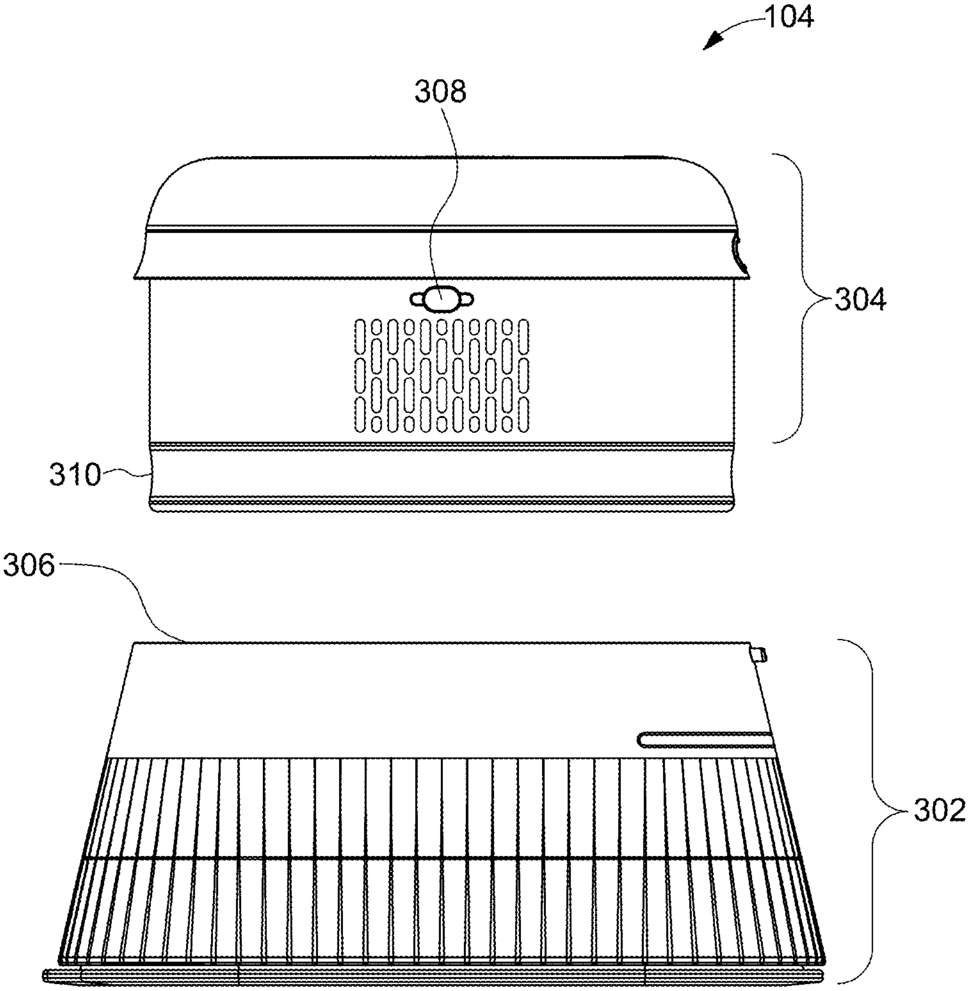
FIGS. 3A-3D illustrates various components of a multipurpose garment care device, in accordance with some embodiments of the present disclosure.
Figure 3B:
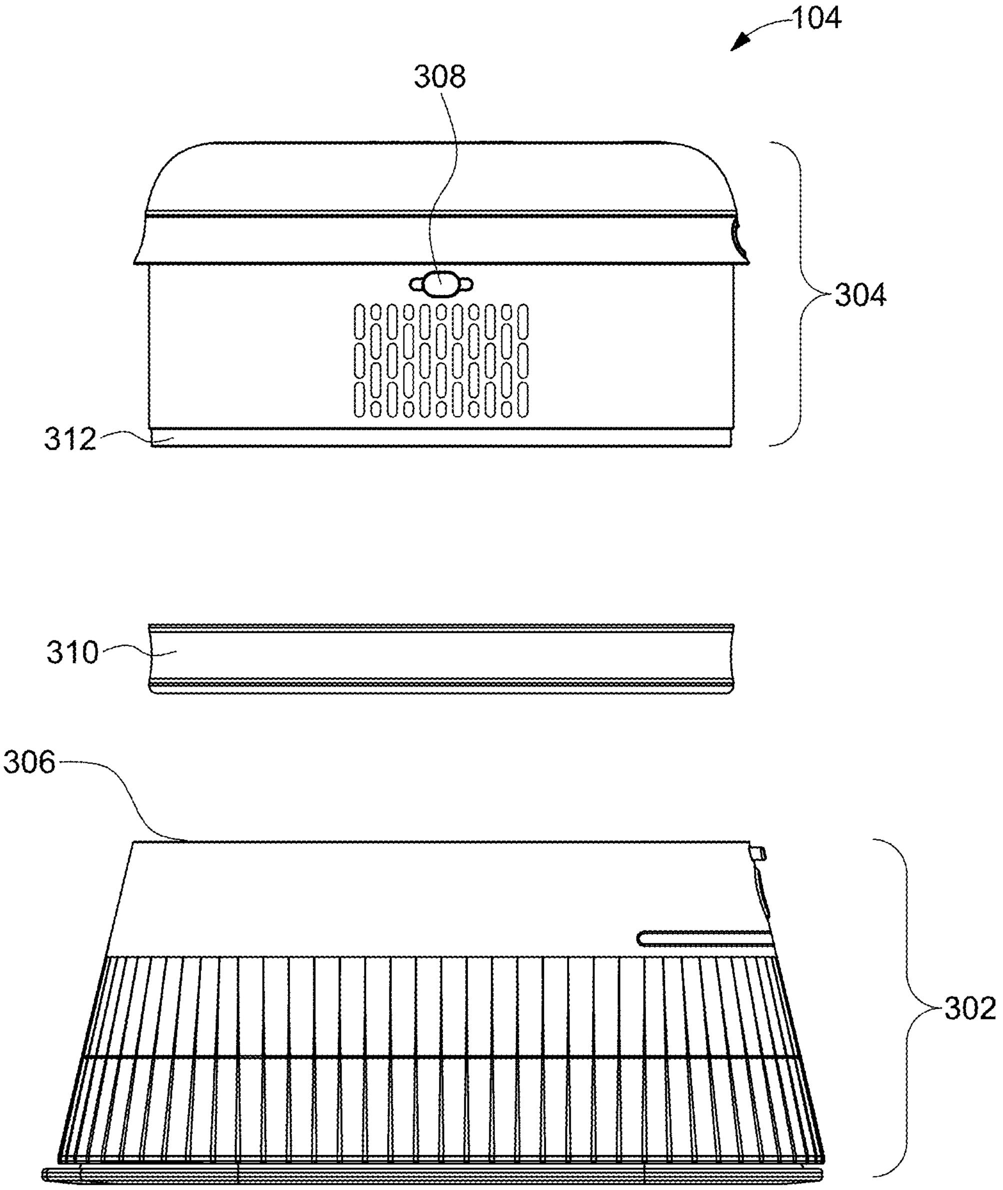

Further, as depicted via FIG. 3B, the detachable handle unit 304 may include the blower dryer casing 310. The blower dryer casing 310 may be detachably attached to a rim 312 surrounding a bottom surface 314 of the detachable handle unit 304. In other words, the user may attach the blower dryer casing 310 to the detachable handle unit 304 to use the blower dryer mechanism of the multipurpose garment care device 104. Alternatively, the user may detach the blower dryer casing 310 from the detachable handle unit 304 to use the ultrasonic stain removing head or the fabric shaving head based on his requirements. A technique for using the blower dryer mechanism, the ultrasonic stain removing head, and the fabric shaving head of the multipurpose garment care device 104 is further depicted and explained in detail in conjunction with FIGS. 5A-5E, 6A-6C, and 7A-7C, respectively.

Figure 3C:
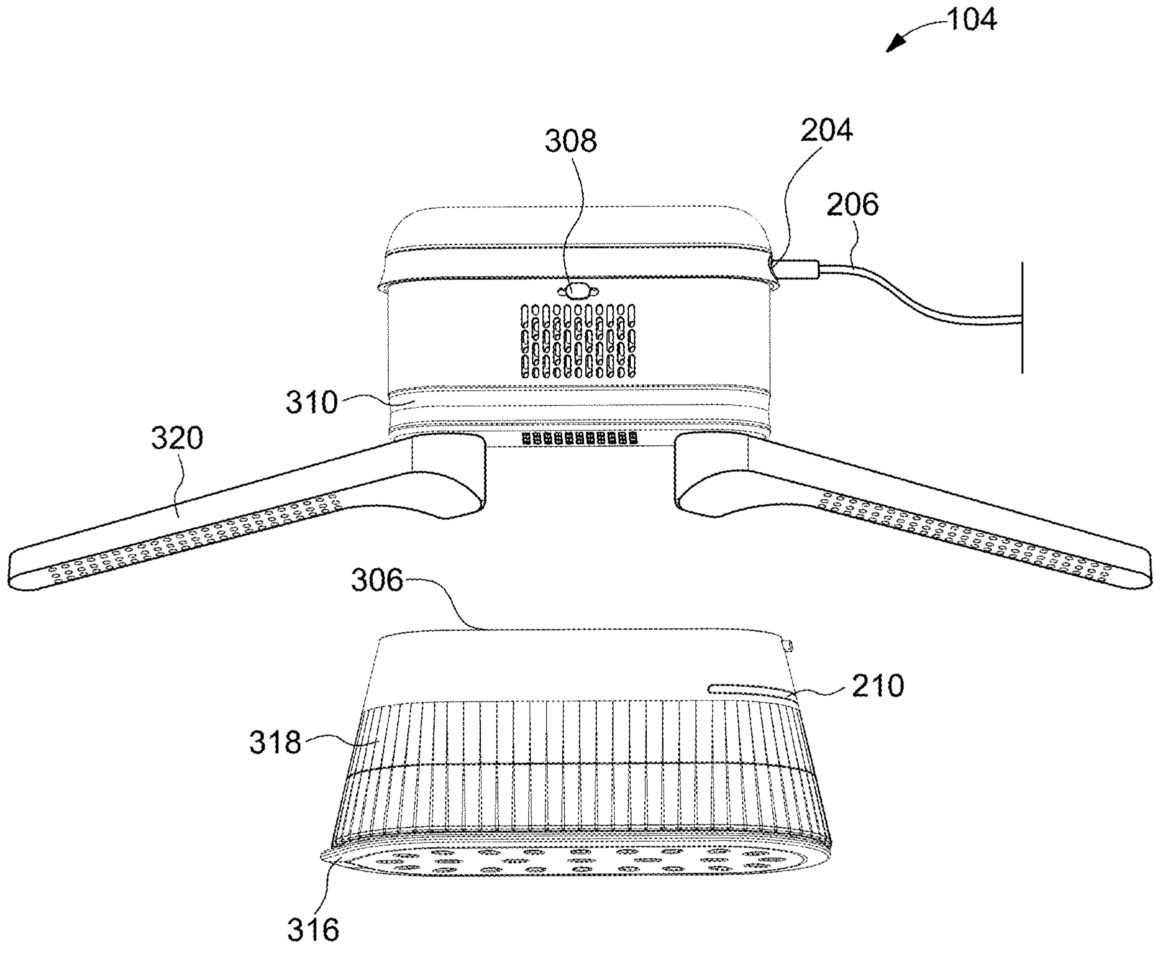

Further, as depicted via FIG. 3C, the main unit 302 may include the steam iron. The steam iron may include a soleplate 316, a water compartment 318, and a set of buttons (not shown) to operate the steam iron. In an embodiment, the set of buttons may be used for adjusting steam and to trigger steam spray based on fabric requirements of the garment. In addition, as depicted via the FIG. 3C, the temperate indicator 210 may be present on the main unit 302. A technique of operating the steam iron of the multipurpose garment care device 104 is further depicted and explained in detail in conjunction with FIG. 4.

Further, in order to use the blower dryer mechanism, the detachable handle unit 304 may draw out (or uncoupled) from the cavity 306 of the main unit 302. Once the detachable handle unit 304 is uncoupled, a detachable pair of hanger attachments 320 may be connected to a pair of attachments holders within the blower dryer casing 310 as shown via the FIG. 3C. Upon connecting the detachable pair of hanger attachments 320, the blower dryer mechanism of the detachable handle unit 304 may be operated. It should be noted that the blower dryer mechanism may enable the user to operate the detachable handle unit 304 of the multipurpose garment care device 104 as the blower dryer to dry garments quickly and easily. A technique for operating the detachable handle unit 304 as the blower dryer is further depicted and explained in detail in conjunction with FIG. 5A-5E.

Figure 3D:
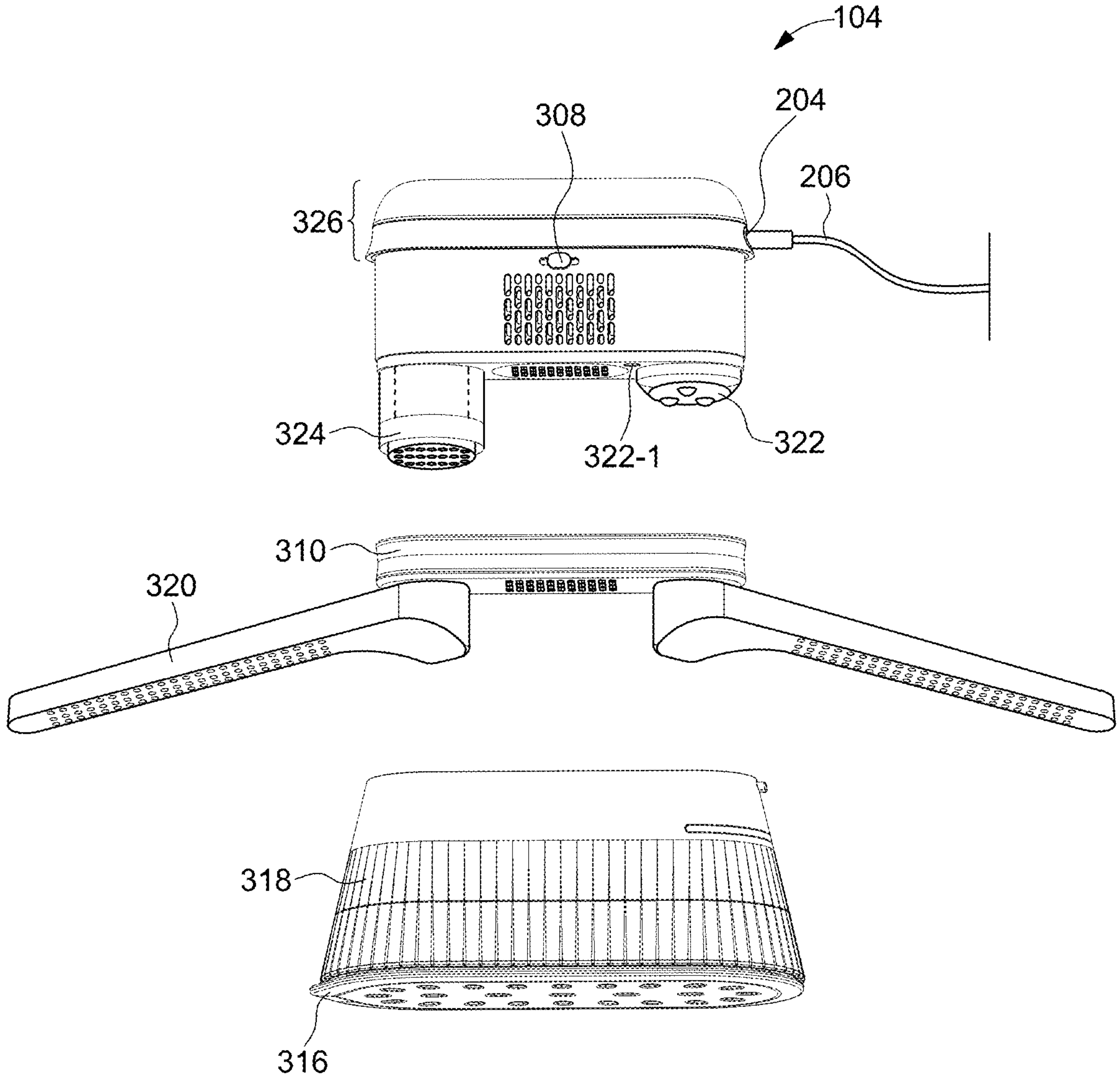

Further, in order to access the ultrasonic stain removing head, i.e., an ultrasonic stain removing head 322, and the fabric shaving head, i.e., a fabric shaving head 324, the blower dryer casing 310 may be detached from the detachable handle unit 304 as shown via FIG. 3D. It should be noted that, the ultrasonic stain removing head 322 or the fabric shaving head 324 may be operated based on user requirement by selecting a corresponding operating mode using the switch 308. In other words, in order to use the ultrasonic stain removing head 322, the user may select an ultrasonic stain removing operating mode, for example, by shifting the switch 308 to extreme right. Further, after selecting the ultrasonic stain removing operating mode the user may press a release button 322-1 to release the ultrasonic stain removing head 322 for usage. After pressing the release button 322-1, the ultrasonic stain removing head 322 may be drawn out from a hollow section on the bottom surface 314. Alternatively, in order to use the fabric shaving head 324, the user may select a fabric shaving operating mode, for example, by shifting the switch 308 to extreme left. Examples of the switch 308 may include, a toggle switch, a slide switch, a dual in-line package (DIP) switch, and the like.

A technique for accessing the ultrasonic stain removing head 322 or the fabric shaving head 324 is further explained in detail in conjunction with FIGS. 6A-6C and FIGS. 7A-70, respectively. Further, as depicted via the present 3D, the multipurpose garment care device 104 may be operated by connecting the detachable power cord 206 to the cord port 204. The cord port 204 may be present on the outer surface of a top section 326 of the detachable handle unit 304. It should be noted that the cord port 204 may be present on the top section 326 in order to enable the user to operate the steam iron, the blower dryer mechanism, the ultrasonic stain removing head 322, or the fabric shaving head 324 of the multipurpose garment device 104 based on his requirement.

Figure 4:
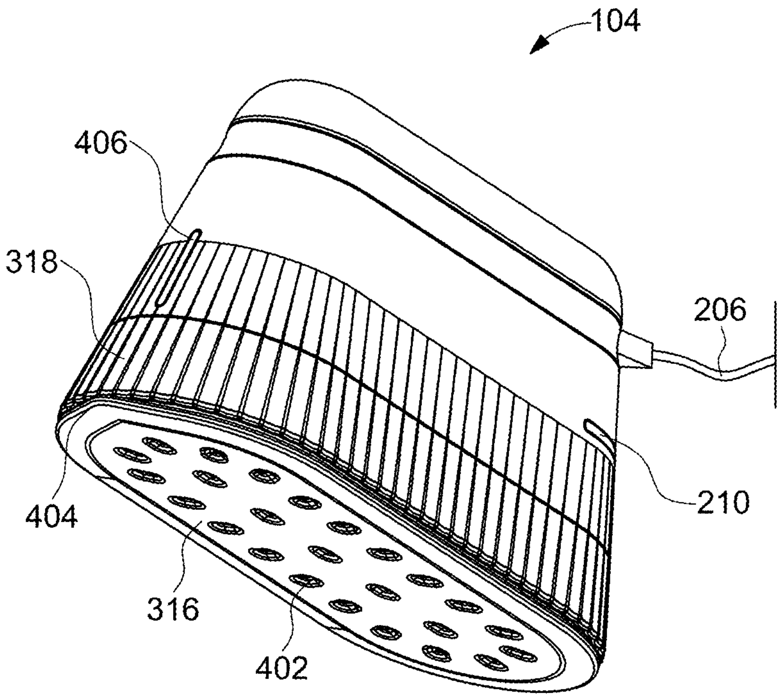
FIG. 4 illustrates an exemplary process of operating a multipurpose garment care device as a steam iron, in accordance with some embodiments of the present disclosure.

Referring now to FIG. 4, an exemplary process of operating the multipurpose garment care device 104 as the steam iron is illustrated, in accordance with some embodiments of the present disclosure. FIG. 4 is explained in conjunction with FIGS. 1A-3D. In order to operate the multipurpose garment care device 104 as the steam iron, initially, the user of the multipurpose garment care device 104 may connect the detachable power cord 206 to the cord port 204 as depicted via the FIG. 4. The detachable power cord 206 may enable the user to electrically operate the multipurpose garment care device 104. Upon connecting the detachable power cord 206, the user may enable (for example: push) the power button 208 to start heating the soleplate 316. As depicted via the FIG. 4, the soleplate 316 may be in a capsule shape. The capsule shape of the soleplate 316 may increase the surface area of the soleplate 316. Further as depicted in the FIG. 4, the sole plate 316 may include a plurality of holes (for example: a hole 402). The plurality of holes may be configured to provide uniform heat distribution. In other words, the plurality of holes may enable the soleplate 316 to heat uniformly.

In addition, one end of the soleplate 316 may include a pointed tip 404, as depicted via the FIG. 4. The pointed tip 404 may provide complete and perfect ironing of a garment due to shown unique design of the soleplate 316 that includes the pointed tip to enable ironing of corners, edges, collars of the garment. Further, the plurality of holes on the soleplate 316 may provide uniform steam distribution as well. In order to trigger the steam spray, a button (e.g., a push button) from the set of buttons (not shown) may be used. In addition, a button from the set of buttons may be used for adjusting steam, e.g., pressure of the steam, based on fabric requirements of the garment. In an embodiment, each of the set of buttons may be present on a top surface of the detachable handle unit 304. In some embodiments, a button (for e.g., a rotating dial) from the set of buttons may be used to select a fabric type, such as wool, cotton, silk, satin, nylon, and the like. In this embodiment, based on the fabric type of the garment that needs to be ironed, the pressure of the steam may be automatically adjusted.

In continuation to the above example, once the detachable power cord 206 is connected to the cord port 204, then initially the user may select the fabric type, for example, cotton for a cotton garment (for example: a cotton shirt) that he needs to iron. It should be noted that the fabric type may be selected using the rotating dial (not shown). Upon selecting the fabric type, the soleplate 316 may uniformly heat to achieve a desired temperature that is suitable for the selected fabric type. As will be appreciated, while the soleplate 316 may be heating to achieve the desired temperature as per fabric requirement, the temperature indicator 210 may be in 'on' state, indicating that the soleplate 316 is heating. For example, in the 'on' state, the temperature indicator 210 may be of 'red color' or 'white color'. Once the soleplate 316 is heated to attain the desired temperature as per the selected fabric type, then the temperature indicator 210 may turn off, i.e., in the 'off' state to indicate that the soleplate 316 has reached the desired temperature.

Further, once the soleplate 316 is heated, then the user may adjust the steam based on their requirement using a corresponding button of the set of buttons. In some embodiments, based on the cotton fabric type selected, the steam (i.e., the pressure of the steam) may be automatically adjusted. Further, the user may trigger the steam spray as and when required by pushing the push button configured for spraying the steam while ironing the cotton shirt. It should be noted that water used for generating the steam may be stored within the water compartment 318. The water compartment 318 may be refillable. Further, a water level indicator 406 may be configured to display a level of the water within the water compartment 318. Further, once the ironing of the cotton shirt is complete, the power button 208 may be disabled and the detachable power cable 206 may be uncoupled from the cord port 204. Furthermore, once the soleplate 316 has reached its normal temperature, then after usage the multipurpose garment care device 104 may be placed back within the casing 102.

Referring now to FIGS. 5A-5E, an exemplary process for operating the blower dryer mechanism of the multipurpose garment care device 104 is illustrated, in accordance with some embodiments of the present disclosure. FIGS. 5A-5E are explained in conjunction with above FIGS. 1A to 4. In order to access the blower dryer mechanism, initially, the detachable handle unit 304 may be drawn out from the cavity 306 of the main unit 302. By way of an example, in order to blow dry a garment, the user may pull out the detachable handle unit 304 from the cavity 306. This is depicted and has been explained in conjunction with FIG. 3A. Once the detachable handle unit 304 is drawn out, then the user may take out the detachable pair of hanger attachments 320 stored within the pair of inbuilt slots 108 within the base portion 106 of the casing 102. This has been depicted and already explained in conjunction with FIG. 1B.

Further, the blower dryer mechanism may include blower vents for easily and quickly drying garments. As depicted via FIG. 5B, the blower dryer mechanism may include a first set of blower vents 502 located on the bottom surface 314 of the detachable handle unit 304. Further, a second set of blower vents 504 may be present on opposite sides of the detachable handle unit 304. In an embodiment, the second set of blower vents 504 may be configured to suck air from an outside environment. In addition, the blower dryer mechanism may include the blower dryer casing 310. The blower dryer casing 310 may include a third set of blower vents 506 and a pair of attachment holders 508, as depicted via the FIG. 5B.

The blower dryer casing 310 may get attached to the rim 312 surrounding the bottom surface 314 of the detachable handle unit 304. It should be noted that, the blower dryer casing 310 may be detachably attached to the detachable handle unit 304. In other words, in one embodiment, as depicted via FIG. 5C, the blower dryer casing 310 may be attached to the detachable handle unit 304 to use the blower dryer mechanism. In alternative embodiment, the blower dryer casing 310 may be detached or uncoupled from the detachable handle unit 304 to use one of the ultrasonic stain removing head 322 or the fabric shaving head 324 integrated to the detachable handle unit 304.

The blower dryer casing 310 may get attached to the rim 312 in way such that the first set of blower vents 502 may get aligned with the third set of blower vents 506 to create an air column. In some embodiments, the first set of blower vents may be a hollow space on the bottom surface 314 of the detachable handle unit 304. Further, each of the pair of attachment holders 508 may be configured to attach a corresponding hanger attachment of the detachable pair of hanger attachments 320. In other words, the user may connect the hanger attachment of the detachable pair of hanger attachments 320 to its corresponding attachment holder of the pair of attachment holders 508, as depicted via FIG. 5D. In addition, each of the detachable pair of hanger attachments 320 may include a fourth set of blower vents 510 as depicted via the FIG. 5D.

Figure 5A:
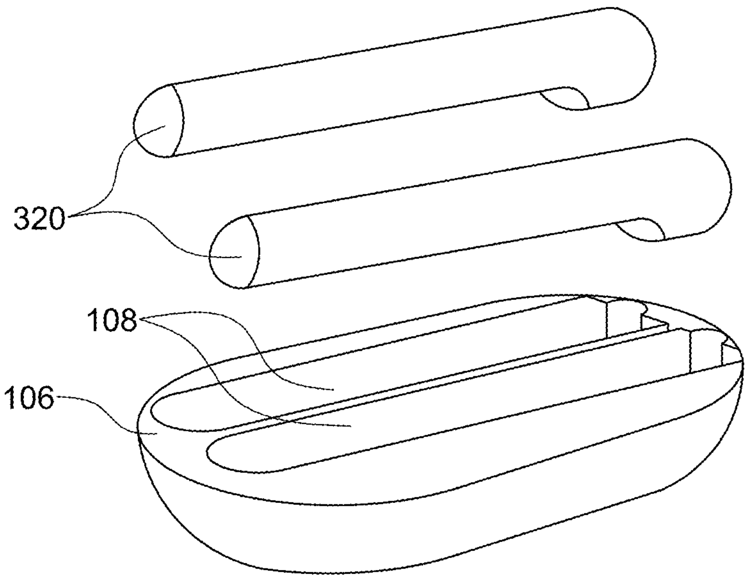
FIGS. 5A-5E illustrate an exemplary process of operating a blower dryer mechanism of a multipurpose garment care device, in accordance with some embodiments of the present disclosure.
Figure 5B:
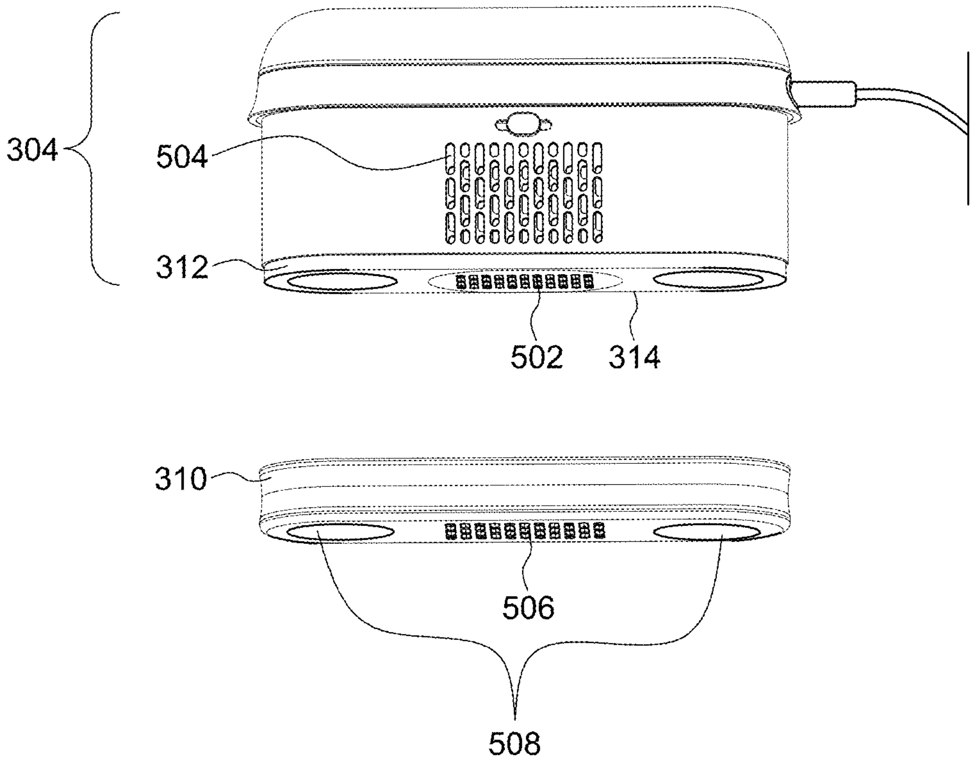
Figure 5C:
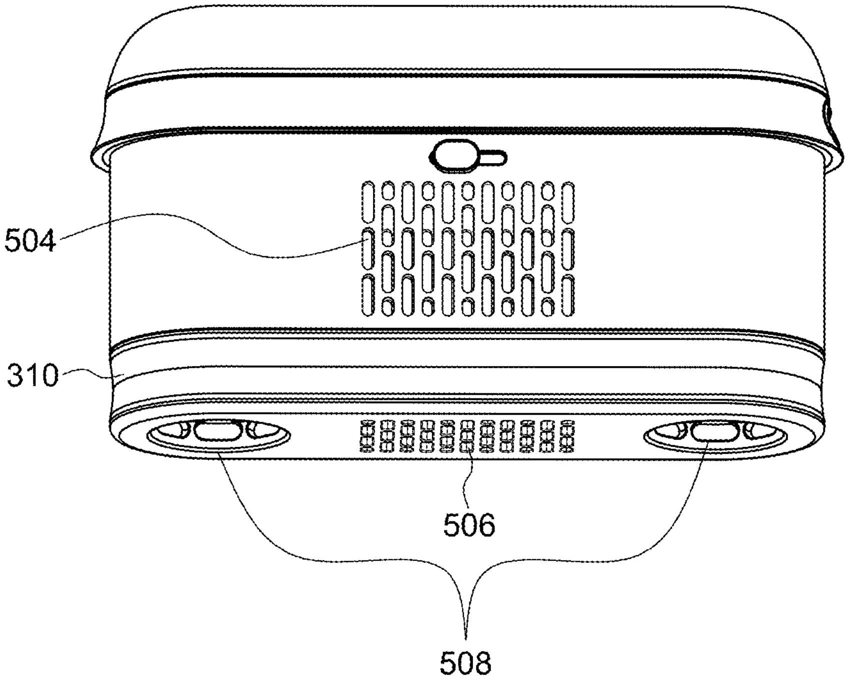
Figure 5D:
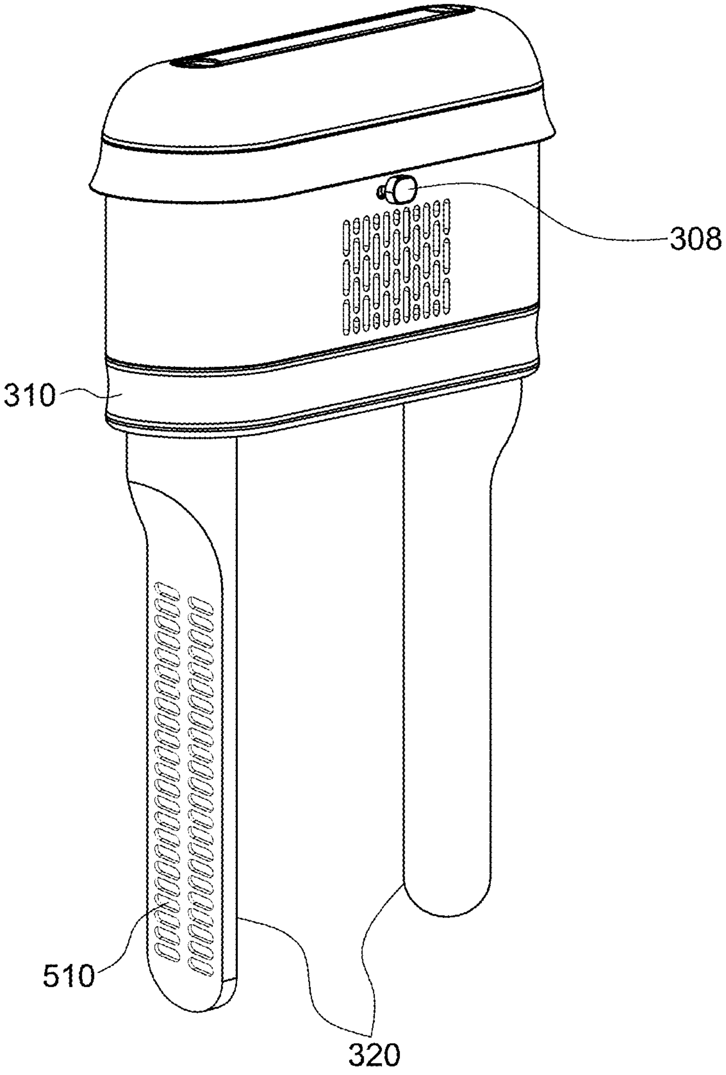
Figure 5E:
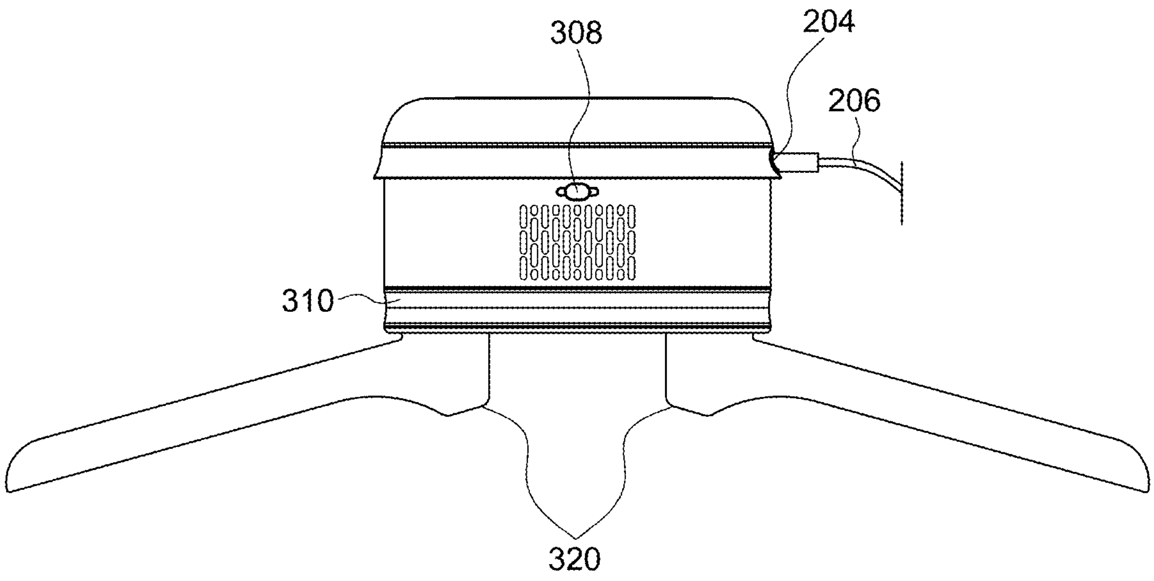

Once the detachable pair of hanger attachments 320 gets connected to its corresponding attachment holder, then each of the detachable pair of hanger attachments 320 may adjusted to a predefined angle to create a hanging arrangement for the garment as depicted via FIG. 5E. Further, the user may hang the garment that needs to be blow dried on the detachable pair of hanger attachments 320. It should be noted that the user may select a corresponding operating mode, i.e., a blower dryer mode via the switch 308 to operate the blower dryer mechanism. In addition to selection of the operating mode, the user may connect the detachable power cord 206 to the cord port 204 and enable the power button 208 to start the blower dryer mechanism. As will be appreciated, once the blower dryer mechanism is started after hanging the garment, the air sucked from the outside environment via the second set of blower vents 504 may pass through the air column created by aligning the first set of blower vents 502 with the third set of blower vents 506 and the detachable pair of hanger attachments 320 to blow dry the garment.

Figure 6A:
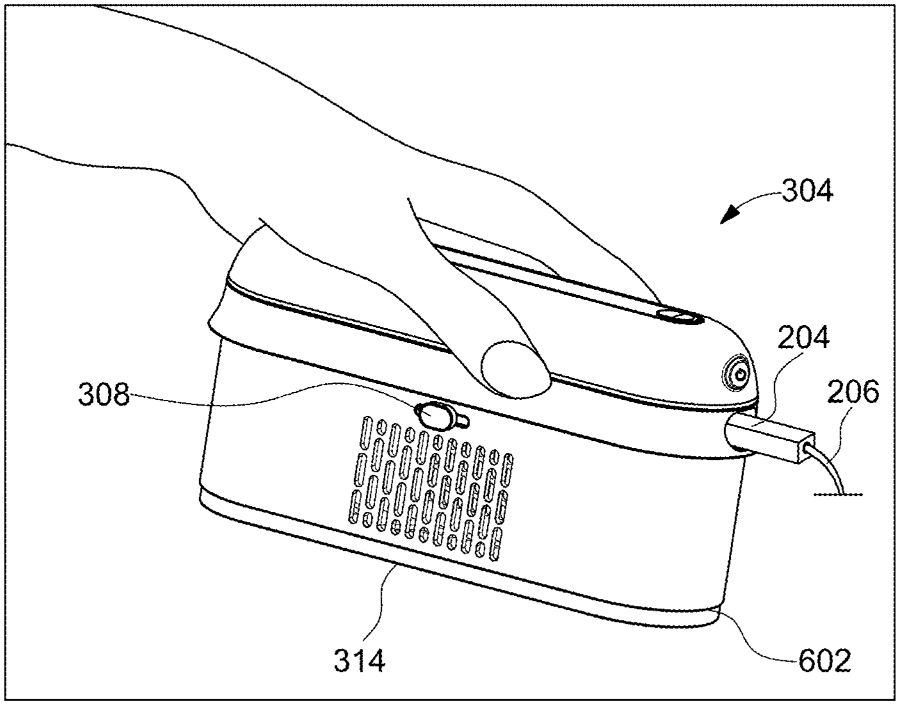
FIGS. 6A-6C illustrate an exemplary process of operating an ultrasonic stain removing head of a multipurpose garment care device, in accordance with some embodiments of the present disclosure.
Figure 6B:
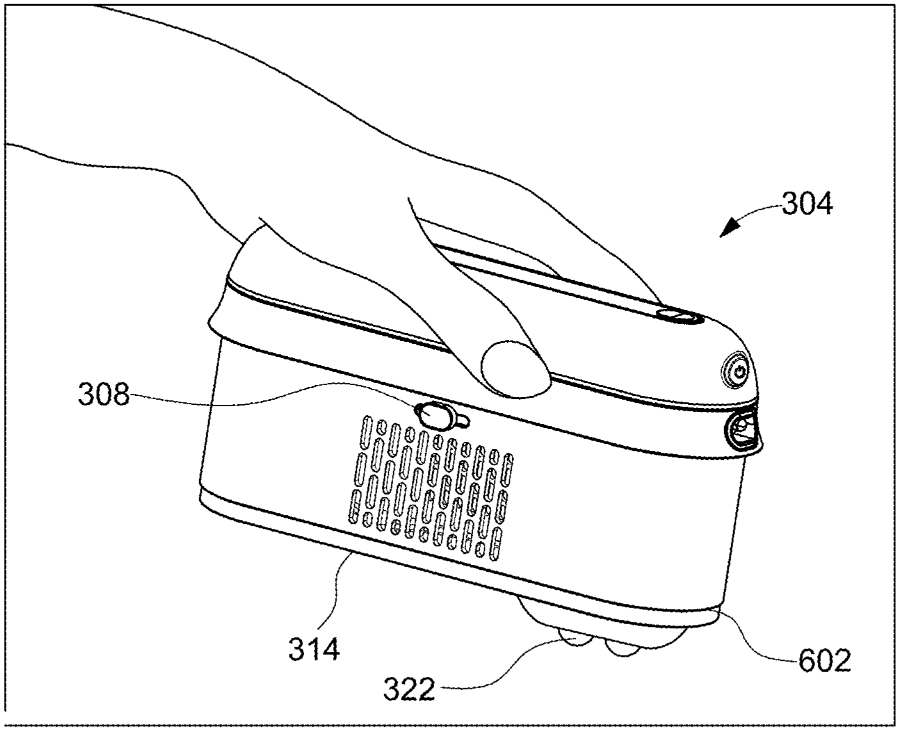
Figure 6C:
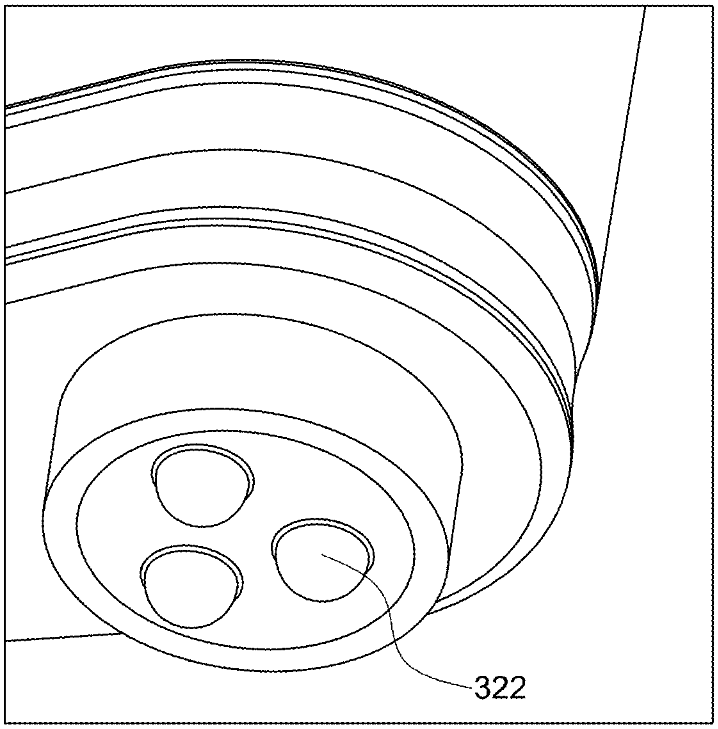

Referring now to FIGS. 6A-6C, an exemplary process of operating the ultrasonic stain removing head 322 of the multipurpose garment care device 104 is illustrated, in accordance with some embodiments of the present disclosure. FIGS. 6A-6B are explained in conjunction with the above FIGS. 1A to 5E. In order to use the ultrasonic stain removing head 322, initially, the user may draw out the detachable handle unit 304 from the cavity 306 of the main unit 302. Further, the user may detach the blower dryer casing 310 from the rim 312. Upon detaching the blower dryer casing 310, the user may be able to access the ultrasonic stain removing head 322. As depicted via FIG. 6A, the ultrasonic stain removing head 322 may be located on one side, e.g. right side 602 on the bottom surface 314. Further, the ultrasonic stain removing head 322 may be positioned within the hollow section created on the bottom surface 314.

In order to access the ultrasonic stain removing head 322, the user may select a corresponding operating mode, i.e., the ultrasonic stain removing mode via the switch 308. In other words, the user may slide the switch 308 to its extreme right. Further, after selecting the ultrasonic stain removing operating mode, the user may press the release button 322-1 present near the hollow section to release the ultrasonic stain removing head 322 for usage. After pressing the release button 322-1, the ultrasonic stain removing head 322 may be drawn out from the hollow section on the bottom surface 314, as depicted via FIG. 6B. Once the ultrasonic stain removing head 322 is released, the user may use the ultrasonic stain removing head 322 to remove any type of stain (including stubborn stains) or dirt from his garments gently and effectively. It should be noted that in order to operate the ultrasonic stain removing head 322, upon removing the blower dryer casing 310, initially, the user may connect the detachable power cord 206 to the cord port 204 and enable the power button 208 to use the ultrasonic stain removing head 322.

In other words, once the user may have connected the detachable power cord 206 and have selected the ultrasonic stain removing mode using the switch 308, then the user may use the ultrasonic stain removing head 322 to remove stains and dirt. For this, the user may pour water and cleaning solution on stained area of the garment. Once this is done, then the user may move the ultrasonic stain removing head 322 within the stained area of the garment. It should be noted that the ultrasonic stain removing head 322 may provide effective stain removal as it uses high frequency ultrasonic waves that are transmitted through a liquid medium (e.g., water, or cleaning solution) and create microscopic bubbles that provide effective stain removal without causing damage to fabric of the garments. Further, after usage of the ultrasonic stain removing head 322, the ultrasonic stain removing head 322 may be pushed back inside the hollow section. An exemplary representation of the ultrasonic stain removing head 322 is depicted via FIG. 6C.

Figure 7A:
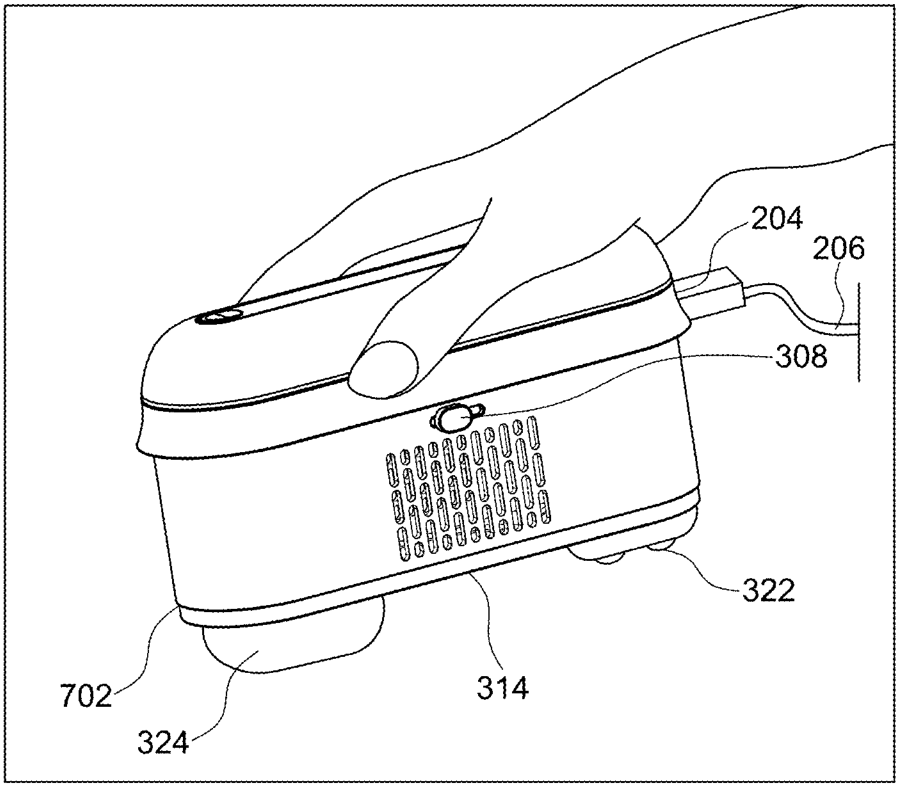
FIGS. 7A-7C illustrate an exemplary process of operating a fabric shaving head of a multipurpose garment care device, in accordance with some embodiments of the present disclosure.
Figure 7B:
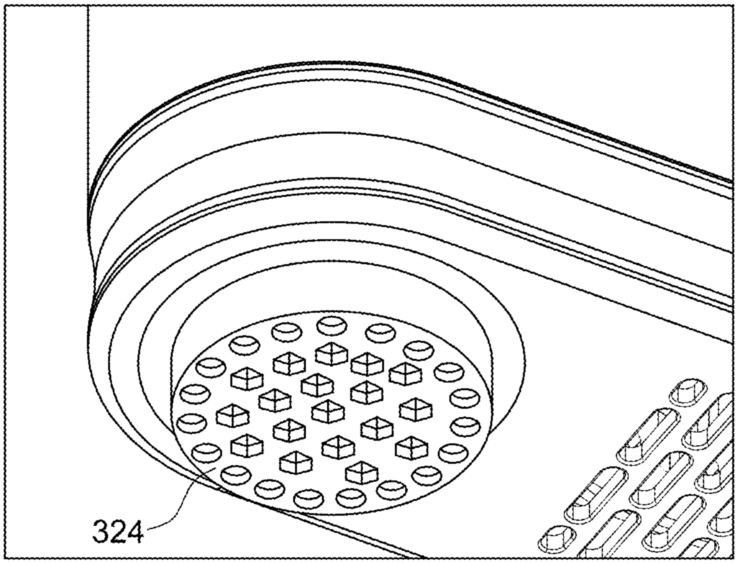
Figure 7C:
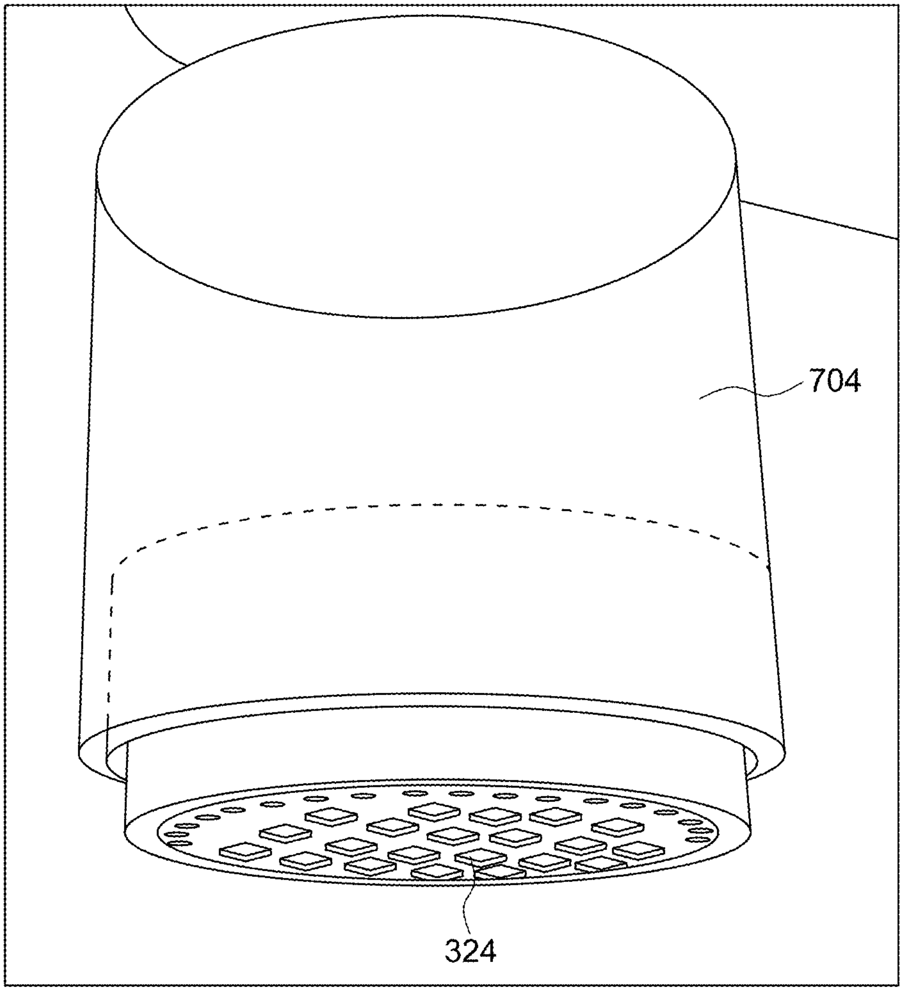

Referring now to FIGS. 7A-7C, an exemplary process of operating the fabric shaving head 324 of the multipurpose garment care device 104 is depicted, in accordance with some embodiments of the present disclosure. FIGS. 7A-7C are explained in conjunction with the above FIGS. 1A to 6C. In order to use the fabric shaving head 324, initially, the user may draw out the detachable handle unit 304 from the cavity 306 of the main unit 302. Further, the user may detach the blower dryer casing 310 from the rim 312. Upon detaching the blower dryer casing 310, the user may be able to access the fabric shaving head 324.

As depicted via FIG. 7A, the fabric shaving head 324 may be located opposite to the ultrasonic stain removing head 322 on the bottom surface 314 on another side, e.g., left side 702 of the detachable handle unit 304. In order to operate the fabric shaving head 324, the user may select a corresponding operating mode, i.e., a fabric shaving mode via the switch 308. Further, upon selecting the fabric shaving mode, the user may connect the detachable power cord 206 to the cord port 204 and enable the power button 208 to operate the fabric shaving head 324.

As depicted via the present FIG. 7A, the fabric shaving head 324 may be projected in a normal condition, i.e., the fabric shaving head 324 may not be pushed inside any hollow section on the bottom surface 314. The fabric shaving head 324 may be configured to remove lint and fuzz from the garments. As will be appreciated, the fabric shaving head 324 may also be referred to as the fabric shaver or a lint and fuzz remover. Further, an exemplary representation of the fabric shaving head 324 is depicted via FIG. 7B. As depicted in the FIG. 7B, the fabric shaving head 324 may include a plurality of shaving blades (e.g., rotating blades) with different shaving hole sizes. By way of an example, once the fabric shaving mode is selected and the detachable handle unit 304 is powered, then the user may gently glide over the fabric shaving head 324 over a garment from which lint's (or fabric pills) needs to be removed. It some embodiments, the user may adjust settings for the plurality of shaving blades depth or cutting intensity using one or more buttons (not shown) present of the top surface of the detachable handle unit 304.

Further, a collector compartment 704 may be affixed to the fabric shaving head 324 to collect lint and fuzz, as depicted via FIG. 7C. The collector compartment 704 may get unfastened from the detachable handle unit 304 using a rotating mechanism to clean the collector compartment 704. In other words, once the user has completed the lint and fuzz removing process or when the collector compartment 704 is completely full, then the user may unfasten the collector compartment 704 from the detachable handle unit 304 to clean the collector compartment for next use. It should be noted that collector compartment 704 may be unfastened from the detachable handle unit 304 for cleaning after the detachable handle unit 304 is unplugged.

Various embodiments provide a multipurpose garment care device. The disclosed multipurpose garment care device may include a main unit including a steam iron. The steam iron may include a sole plate, a water compartment, and a set of buttons for operating the steam iron. Further, the disclosed multipurpose garment care device may include a detachable handle unit positioned within a cavity of the main unit. The detachable handle unit may include a blower dryer mechanism. The blower dryer mechanism may include a first set of blower vents located on a bottom surface and a second set of blower vents located on opposite sides, of the detachable handle unit. The blower dryer mechanism may further include a blower dryer casing detachably attached to a rim surrounding the bottom surface of the detachable handle unit. The blower dryer casing may include a third set of blower vents and a pair of attachment holders. The first set of blower vents may get aligned with the third set of blower vents to create an air column, upon attaching the blower dryer casing with the rim. The blower dryer mechanism may further a detachable pair of hanger attachments including a fourth set of blower vents. The detachable pair of hanger attachments may get connected to the pair of attachment holders of the blower dryer casing. Furthermore, the disclosed multipurpose garment care device may include an ultrasonic stain removing head located on the bottom surface on one side of the detachable handle unit. The ultrasonic stain removing head may be positioned within a hollow section on the bottom surface of the detachable handle unit. In addition, the disclosed multipurpose garment care device may include a fabric shaving head and a collector compartment affixed to the fabric shaving head to collect lint and fuzz. The fabric shaving head may be located opposite to the ultrasonic stain removing head on the bottom surface on another side of the detachable handle unit.

Thus, the present disclosure may overcome drawbacks of traditional conventional products required for maintaining clothes (or garments) especially while travelling. The present disclosure discloses a multipurpose garment care device that may cater to diverse needs of users with respect to clothes maintenance during travel. In other words, the disclosed multipurpose garment care device may provide convenience to users in easily maintaining their clothes, especially for group of users who prefer to travel with their personal devices, ensuring they step out in style, no matter where their journey takes them. For enabling convenient maintenance of the clothes, the multipurpose garment care device may include components, such as a steam iron, a blower dryer mechanism, an ultrasonic stain removing head, and a fabric shaving head, required for maintaining clothes. In other words, the multipurpose garment care device may be designed in a way such that each component, i.e., the steam iron, the blower dryer mechanism, the ultrasonic stain removing head, and the fabric shaving head may be integrated within the multipurpose garment care device in a compact way. This makes the multipurpose garment care device an extremely travel friendly product and a complete solution for maintaining clothes even while travelling. Further, since the disclosed multipurpose garment care device includes almost every component required for maintaining clothes, hence the disclosed multipurpose garment care device avoid wastage of space required for keeping each of these components as a single product either in our home space or in our travel bags.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A multipurpose garment care device comprising:

a main unit comprising:

a steam iron comprising a sole plate, a water compartment, and a set of buttons for operating the steam iron;

a detachable handle unit positioned within a cavity of the main unit, wherein the detachable handle unit comprises:

a blower dryer mechanism comprising:

a first set of blower vents located on a bottom surface and a second set of blower vents located on opposite sides, of the detachable handle unit;

a blower dryer casing is configured to be detachably attached to a rim surrounding the bottom surface of the detachable handle unit, wherein the blower dryer casing comprising a third set of blower vents and a pair of attachment holders, and wherein the first set of blower vents gets aligned with the third set of blower vents to create an air column, upon attaching the blower dryer casing with the rim; and a detachable pair of hanger attachments comprising a fourth set of blower vents, wherein the detachable pair of hanger attachments is configured to gets connected to the pair of attachment holders of the blower dryer casing;

an ultrasonic stain removing head configured to be located on the bottom surface on one side of the detachable handle unit, wherein the ultrasonic stain removing head is configured to be positioned within a hollow section on the bottom surface of the detachable handle unit; and a fabric shaving head and a collector compartment affixed to the fabric shaving head to collect lint and fuzz, wherein the fabric shaving head is configured to be located opposite to the ultrasonic stain removing head on the bottom surface on another side of the detachable handle unit.

2. The multipurpose garment care device of claim 1, wherein the detachable handle unit is configured to be drawn out from the cavity of the main unit to access one of the blower dryer mechanism, the ultrasonic stain removing head, or the fabric shaving head of the detachable handle unit.

3. The multipurpose garment care device of claim 2, wherein the detachable handle unit further comprises a switch configured to operate one of the blower dryer mechanism, the ultrasonic stain removing head, or the fabric shaving head of the detachable handle unit by selecting a corresponding operating mode using the switch.

4. The multipurpose garment care device of claim 3, wherein the ultrasonic stain removing head is released from the hollow section using a release button for usage and is pushed back within the hollow section after usage.

5. The multipurpose garment care device of claim 1, wherein the multipurpose garment care device is operated using a power button present on a top section of the detachable handle unit by attaching a detachable power cord to a cord port present on an outer surface of the top section of the detachable handle unit.

6. The multipurpose garment care device of claim 1, wherein the set of buttons is used for adjusting steam and to trigger steam spray based on fabric requirements, and wherein the main unit comprises a temperature indicator for indicating a temperature of the soleplate.

7. The multipurpose garment care device of claim 1, wherein the soleplate is in a capsule shape comprising a plurality of holes for uniform heat distribution, and wherein one end of the soleplate comprises a pointed tip.

8. The multipurpose garment care device of claim 1, further comprising a casing to cover and store the multipurpose garment care device.

9. The multipurpose garment care device of claim 8, wherein the casing comprises a covering lid and a base portion, and wherein the base portion comprises a pair of inbuilt slots for storing the detachable pair of hanger arrangements.

* * * * *